(12) United States Patent
Liaw et al.

(10) Patent No.: US 8,362,171 B2
(45) Date of Patent: Jan. 29, 2013

(54) NORBORNENE MONOMERS WITH AN EPOXY GROUP AND POLYMER MATERIAL THEREOF

(75) Inventors: Der-Jang Liaw, Taipei (TW); Ching-Cheng Huang, Taipei (TW)

(73) Assignee: National Taiwan University of Science & Technology, Taipei (TW)

( * ) Notice: Subject to any disclaimer, the term of this patent is extended or adjusted under 35 U.S.C. 154(b) by 847 days.

(21) Appl. No.: 11/905,940

(22) Filed: Oct. 5, 2007

(65) Prior Publication Data

US 2009/0043059 A1 Feb. 12, 2009

(30) Foreign Application Priority Data

Aug. 8, 2007 (TW) ................................ 96129208 A (51) Int. Cl.
*C08F 24/00* (2006.01)
(52) U.S. Cl. ........ 526/281; 525/242; 525/292; 525/293; 525/294; 525/298; 525/299; 525/308; 525/326.7; 525/328.2; 525/374; 525/386; 526/90; 526/172; 526/193; 526/221; 526/258; 526/259; 526/266; 526/273; 526/280; 526/332; 528/357; 528/368; 528/408; 528/409; 528/412; 528/421; 528/423; 528/491; 528/492
(58) Field of Classification Search .................... 526/90, 526/280, 281, 172, 258, 259, 260, 193, 221
See application file for complete search history.

(56) References Cited

U.S. PATENT DOCUMENTS

| | | | | |
|---|---|---|---|---|
| 4,440,850 A | * | 4/1984 | Paul et al. | 430/325 |
| 5,208,292 A | * | 5/1993 | Hert et al. | 525/166 |
| 7,323,518 B2 | * | 1/2008 | Liaw et al. | 525/301 |
| 7,329,758 B1 | * | 2/2008 | Grubbs et al. | 548/103 |
| 7,335,704 B2 | * | 2/2008 | Liaw et al. | 525/279 |
| 2006/0188806 A1 | * | 8/2006 | Lee et al. | 430/270.1 |
| 2007/0073079 A1 | * | 3/2007 | Liaw et al. | 560/128 |

OTHER PUBLICATIONS

Liaw, D. J. et al., "Novel Active Ester-bridged Copolynorbornene Materials Containing Terminal Functional hydroxyl, amino, methacryloyl or ammonium Groups via Ring-Opening Metathesis Polymerization", J. Polym. Sci., Part A: Polym. Chem. 2005, 43, 4233-4247.*
Liaw, D. J. et al., "Novel Doubly Polymerizable Functional Norbornene: Synthesis, Reactivity and Its Macromolecular Architectures from Dual Cure via Ring-Opening Metathesis Polymerization and Radical Photopolymerization", J. Polym. Sci., Part A: Polym. Chem. 2006, 44, 6287-6298.*
Liaw, D. J. et al., "Novel Organosoluble Polynorbornene Bearing a Polar, Pendant, Ester-Bridged Epoxy Group via Living Ring-Opening Metathesis Polymerization", J. Polym. Sci., Part A: Polym. Chem. 2006, 44(15), 4428-4434.*
Liaw, D. J. et al "Molecular architecture effect on reactivity of polynorbornenes with pendant a,b-unsaturated amide or ester bridged chains via ring-opening metathesis polymerization", Polymer 2006, 47, 4613-4621.*

* cited by examiner

Primary Examiner — Richard A Huhn (74) Attorney, Agent, or Firm — Muncy, Geissler, Olds & Lowe, PLLC (57) ABSTRACT

Norbornene monomers with epoxy groups and polymer materials thereof are disclosed. The Norbornene monomers with epoxy groups are prepared by Diels-Alder reaction. The Norbornene monomers with epoxy groups are highly active for ring-opening-metathesis polymerization (ROMP), and the molecular weight and PDI value of the obtained polymers are controllable.

1 Claim, 4 Drawing Sheets

NORBORNENE MONOMERS WITH AN EPOXY GROUP AND POLYMER MATERIAL THEREOF

BACKGROUND OF THE INVENTION

1. Field of the Invention

The present invention relates to norbornene monomers and polymer material thereof and, more particularly, to norbornene monomers with an epoxy group and polymer material thereof.

2. Description of the Related Art

Polynorbornene and its derivative were the first commercial products produced from ring-opening metathesis polymerization (ROMP) and were important elastomers. Due to high transparency, improved impact resistance, wide temperature range usage and good mechanical and processing properties, polynorbornene and their derivatives are widely applied in shape-memory polymers, lighting devices, machines, electric components, pipe fittings and food packaging.

Previously, metathesis polymerization of olefins was an important process for polymerization, especially the cycloolefin ring-opening metathesis polymerization and non-cyclic diene and alkyne metathesis polymerization. With advances in catalyst development, polymer materials with various functional groups have been developed over recent years via metathesis polymerization.

In related arts, organic metal catalysts have been used for metathesis polymerization. Monomers with poly functional groups, however, are apt to perform multi-reaction in metathesis polymerization with organic metal catalysts. So the use of metathesis polymerization of monomers with poly functional groups has been limited.

Grubbs et. al. reported that the ring-opening metathesis polymerization (ROMP) of cyclo-olefin with Ru catalyst $\{Cl_2Ru(CHPh)(P[C_6H_{11}]_3)_2\}$ exhibits high performance. More particularly, the polymerization of the monomers with functional groups can be achieved with the catalyst because of the combined compound's stability in atmosphere. In addition, such metathesis polymerization resulted in polymers showing high polymerizing rates and large molecular weights, generally associated with living polymerization.

Hence, more research on ROMP of cyclo-olefin derivatives to improve catalyst reactivity soon followed. The research mainly focused on the development of side-chain-type liquid crystals, triblock copolymers synthesized by two-step methods, polymers with various functional groups and polymers having cross-linkable functional groups present in the side chain thereof, etc. The introduction of functional groups improved the optical characteristics and biochemical activity of the polymer.

In addition, ever since nanotechnology and nanomaterials have been researched, compounds with specific structures (such as amphiphilic compounds) have been prepared by ROMP. For example, the forming of compounds with carbon-carbon double bonds by olefin ROMP.

In recent years, ROMP of cycloolefin and metathesis polymerization of non-cyclodiolefin has become very important in polymer synthesis. The preparation of novel functional polymers from norbornene-type monomer is carried out by ROMP.

Polymers with specific functional groups have grown in importance as they exhibit optoelectronic characteristics, biological activity, and nanomaterial properties. Meanwhile, the characteristic of polymer material depends on structure, degree of polymerization, molecular weight, and distribution of molecular weight thereof.

Therefore, the invention provides norbornene monomers with an epoxy group and polymer material thereof, which may be utilized to prepare specific materials for industrial purposes.

BRIEF SUMMARY OF THE INVENTION

The norbornene compounds with epoxy groups of the invention are prepared by Diels-Alder reaction. After obtaining norbornene compounds with epoxy groups, novel polymers were further prepared by ring-opening metathesis polymerization (ROMP) of said compounds. Particularly, the molecular weight and molecular weight distribution of the polymer with side chains of epoxy groups are modified by adjusting the molarity ratio of the norbornene compound and the catalyst.

The first aspect of the invention provides a norbornene compound with epoxy groups, which comprises a structure represented by formula (I), formula (I)

wherein, $R^1$ is H or $CH_3$.

The second aspect of the invention provides a polymer with side chains of epoxy groups, which comprises a structure represented by formula (II), formula (II)

wherein, $R^1$ is H or $CH_3$, and n is an integer between 2 to 10000.

The third aspect of the invention provides a norbornene compound with hydroxyl groups and chlorine groups, which comprises a structure represented by formula (III), formula (III)

wherein, $R^1$ is H or $CH_3$.

The fourth aspect of the invention provides a norbornene polymer with chlorine groups and side chains of linkable double bonds, which comprises structures represented by, formula (IV), formula (V), or formula (VI), formula (IV)

-continued formula (V)

formula (VI)

wherein, $R^1$ is H or $CH_3$, and n is an integer between 2 to 10000.

The fifth aspect of the invention provides a norbornene polymer with hydroxyl groups and side chains of linkable double bonds, which comprises a structure represented by formula (VII), formula (VII)

wherein, $R^1$ is H or $CH_3$, n is an integer between 2 to 10000, and m is an integer between 2 to 10000.

The sixth aspect of the invention provides a norbornene block copolymer with phthalimide groups and epoxy groups, which comprises a structure represented by formula (VIII), formula (VIII)

wherein, $R^1$ is H or $CH_3$, n is an integer between 2 to 10000, and m is an integer between 2 to 10000.

The seventh aspect of the invention provides a norbornene block copolymer with phthalimide groups, hydroxyl and chlorine groups, which comprises a structure represented by formula (IX), formula (IX)

wherein, $R^1$ is H or $CH_3$, n is an integer between 2 to 10000, and m is an integer between 2 to 10000.

The eighth aspect of the invention provides a norbornene block copolymer with phthalimide groups, chlorine groups and linkable double bond, which comprises structures represented by formula (X), formula (XI), and formula (XII), formula (X)

formula (XI)

(formula (XII))

wherein, $R^1$ is H or $CH_3$, n is an integer between 2 to 10000, and m is an integer between 2 to 10000.

The ninth aspect of the invention provides a method of preparing a polymer with side chains of epoxy groups, comprising:

polymerizing a norbornene compound with epoxy groups, comprising a structure represented by formula (I), of:

in the presence of $RuCl_2[C_{21}H_{26}N_2][CHC_6H_5]P(C_6H_{11})_3$ as a catalyst for preparing the polymer with side chains of epoxy groups comprising a structure represented by formula (II), of:

wherein $R^1$ is H or $CH_3$, and n is an integer between 2 to 10000.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The norbornene compounds with epoxy groups of the invention are prepared by Diels-Alder reaction. Novel polymers with narrow molecular weight distribution can be further prepared by ring-opening metathesis polymerization (ROMP) of said monomers.

The reactive conditions for the metathesis polymerization of the present invention include:

(1) Metathesis Catalysts:

These catalysts are tungsten and molybdenum metathesis catalysts, including their halides, oxyhalides or oxides, for example, tungsten hexachloride, tungsten oxychloride, tungsten tetrachloride, molybdenum pentachloride, or molybdenum oxide acetyl acetocarboxylate. Ruthenium metathesis catalysts may also be used in the invention, preferably $Cl_2Ru(CHPh)(P[C_6H_{11}]_3)_2$.

(2) Solvents:

The ring-opening metathesis polymerization of the present invention may be performed without solvents, but the reactions were usually carried out in inert organic solvent.

The preferable organic solvents used were hydrocarbon solvents. More specifically, cyclohydrocarbon solvents which completely dissolve ring-opened polymers. For example, aromatic hydrocarbon such as benzene, ethyl benzene, toluene or xylene; aliphatic hydrocarbon such as n-pentane, hexane or heptane; aliphatic cyclohydrocarbon such as cyclopentane, cyclohexane, methyl cyclohexane or dimethyl cyclohexane; halo hydrocarbon such as methylene chloride, ethylene chloride, dichloroethene, tetrachloroethane, chloroform, dichlorobenzene or trichlorobenzene; or the mixture of said solvents. In addition, the ratio of solvent to monomers typically ranged from 1:1 to 20:1, preferably 2:1 to 10:1.

(3) Temperature:

The temperature range for ring-opening metathesis polymerization was not limited, usually between −20~100° C., preferably between 0~100° C.

Ring-opened Polymers:

The number-average molecular weight (Mn) of the ring-opening metathesis polymers and their co-polymers was 500 to 600,000, and molecular weight distribution (Polydispersity index, PDI=Mw/Mn, i.e., the molecular weight distribution of polymerization) of the polymers and co-polymers was below 1.2. The ring-opened metathesis polymers can be further hydrogenated to form optic polymer materials. The molecular weight and polydispersity were determined by gel permeation chromatography (GPC). Tetrahydrofuran was used as a solvent.

Several examples are used for illustrating the present invention, and the objects, skills and characters will thus be more apparent.

Example 1

Synthesis of Norbornene Monomer with Side Chains of Epoxy Groups

Equal molar of NaOH aqueous solution (5%) and NaCl aqueous solution (20%) were used to extract glycidyl methacrylate (GMA). After repeating the above step several times, $MgSO_4$ was added into the filtrate to perform dehydration treatment. After filtering, the result was subjected to vacuum distillation to obtain pure glycidyl methacrylate (GMA).

1.5 mmole of cyclopentadiene, 4.5 mmole pure glycidyl methacrylate, and 100 ml of toluene were added into a bottle and the mixture was heated to reflux with stirring at 130° C. for 3 hours. Next, the remaining cyclopentadiene, glycidyl methacrylate, and toluene (solvent) were removed by a rotary evaporator, and the result was subjected to vacuum distillation at 110-115° C./4 mmHg, thereby obtaining a pure norbornene monomer with a terminal epoxy group (NBMGE).

The reaction according to Example 1 is shown in reaction formula (I):

reaction formula (I)

(GMA)

NBMGE

Example 2

Synthesis of Norbornene Polymer with Side Chains of Epoxy Groups 2.5 mmole of NBMGE (obtained from Example 1) was dissolved in 5 ml dichloromethane, and then dehydrated and degassed thrice via freeze-pump-thaw cycling. $RuCl_2$ $[C_{21}H_{26}N_2][CHC_6H_5]P(C_6H_{11})_3$ catalyst (2 mg) was dissolved in 1 ml of methylene chloride and argon was subsequently injected into the reactor with a syringe. After completely reacting, 0.1 ml ethyl vinyl ether was added into the bottle to terminate the reaction. The resulting solution was added to 500 ml of methyl alcohol and the mixture was dissolved in 10 ml of methylene chloride and subsequently extracted with 500 methanol three times, thereby obtaining the norbornene monomer with side chains of epoxy groups.

The glass transition temperature (Tg) of the norbornene polymer was 43° C. which was determined by differential scanning calorimeter (DSC). Meanwhile, an exothermal peak for the glass transition temperature (Tg) of a conventional norbornene polymer was 35° C. Therefore, the norbornene polymer of the invention showed higher thermal stability than the conventional norbornene polymer (PolyNBMGE).

The reaction according to Example 1 is shown in reaction formula (II):

reaction formula (II)

Figure 1:
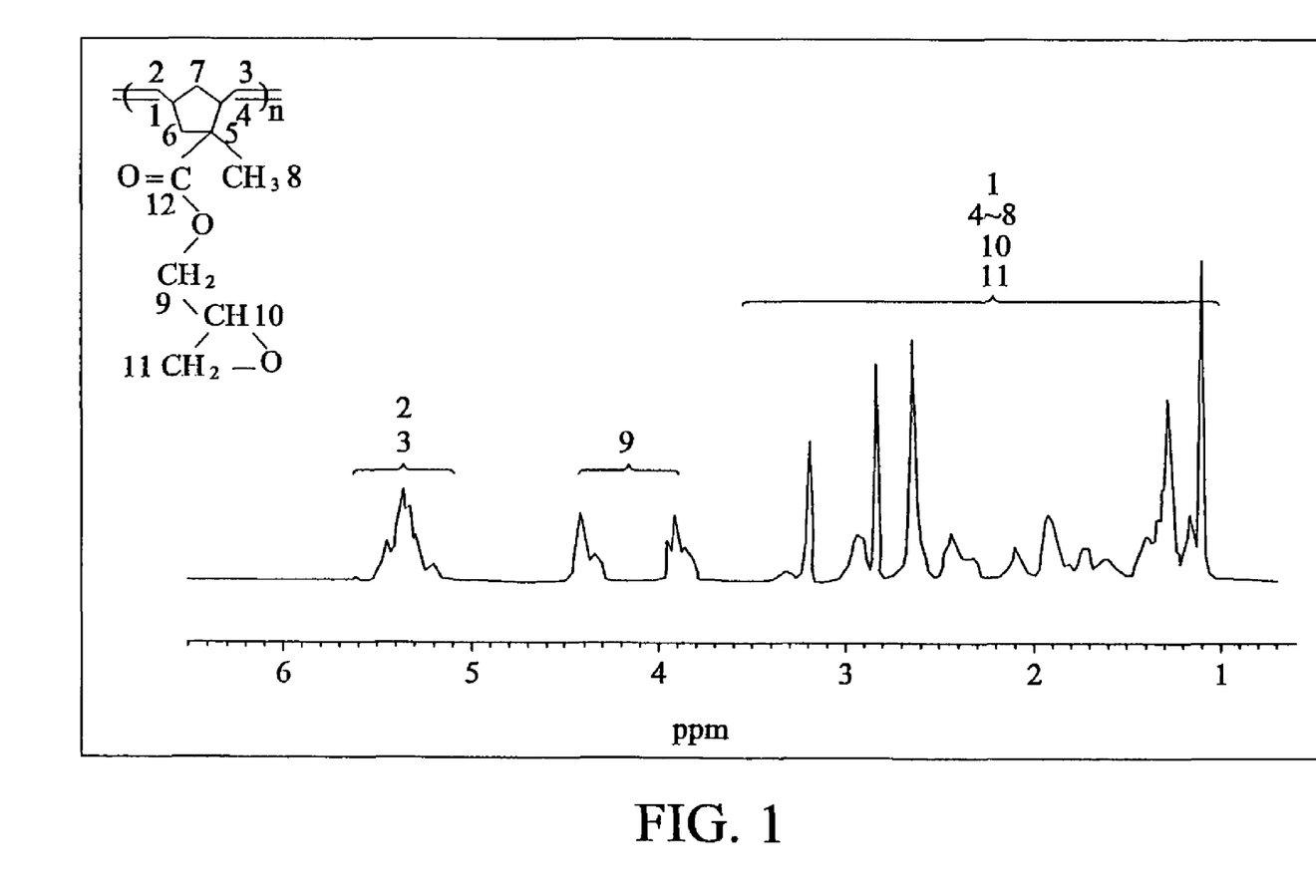
FIG. 1 shows 400 MHz $^1$H NMR spectrum of Poly-NB-MGE obtained from Example 2 of the invention.

FIG. 1 shows 400 MHz $^1$H NMR spectrum of PolyNB-MGE (obtained from Example 2).

Example 3

Method for Modifying the Molecular Weight of the Norbornene Polymer

Figure 2:
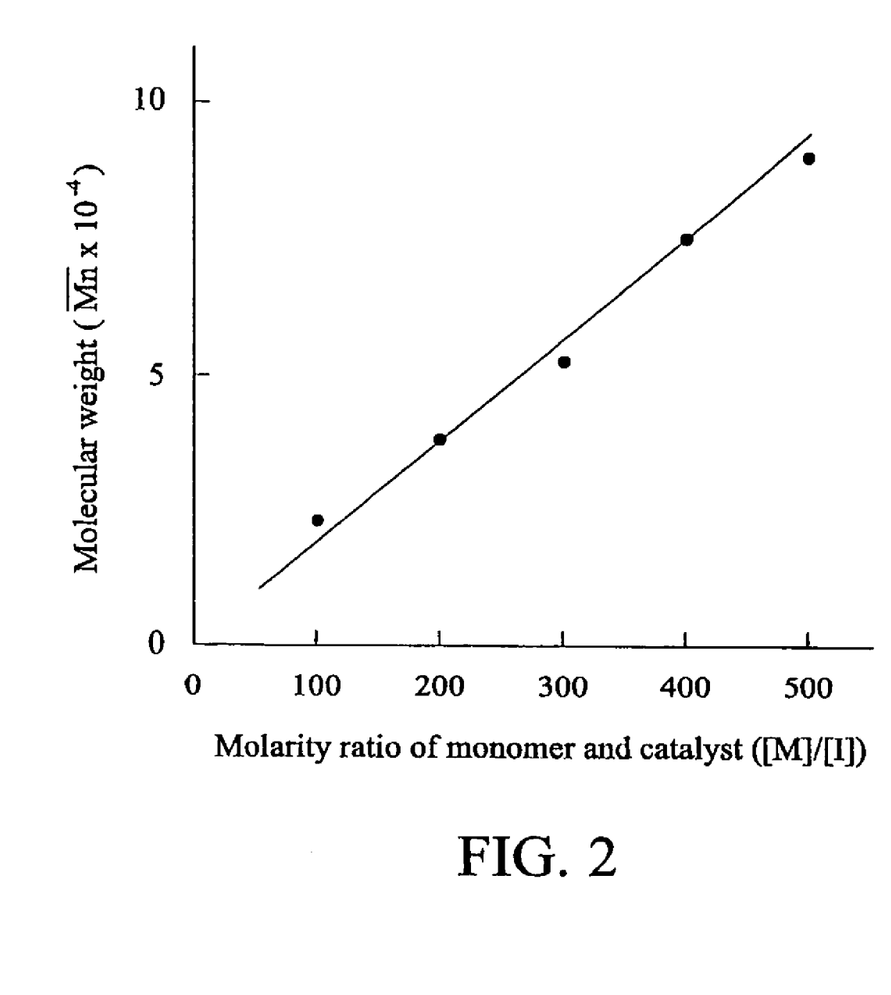
FIG. 2 shows a graph plotting molarity ratio of NBMGE and Ru catalyst ([M]/[I]) against molecular weight of norbornene polymer as disclosed in Examples 2 and 3.

Example 3 was performed as Example 2 except for substitution of the molarity ratio of NBMGE and Ru catalyst ([M]/[I]) 500 for 100. The molecular weight of the obtained polymer was measured by gel permeation chromatography (GPC) analysis, as show in FIG. 2. Accordingly, it should be noted that the molecular weight and molecular weight distribution of the polymer with side chains of epoxy groups can be modified by adjusting the molarity ratio of the norbornene compound and the catalyst.

Comparative Example 1

Comparative Example 1 was Performed as Example 3 Except for Substitution of the Norbornene Compound for NBMGE.

The reaction according to Comparative Example 1 is shown in reaction formula (III):

formula (III)

Meanwhile, the obtained polymer has a molecular weight distribution of more than 1.2.

Example 4

Synthesis of Norbornene Polymer With Hydroxyl Groups and Chlorine Groups

Poly-NBMGE prepared from Example 2 was dissolved in dichloromethane, and an excess of HCl gas was introduced into the mixture and heated to reflux. The obtained result was purified by methanol, thereby obtaining the norbornene polymer Poly-NBHClMGE.

The reaction according to Example 4 is shown in reaction formula (IV):

reaction formula (IV)

PolyNBMGE

PolyNBHClMGE
wherein n>1.

Figure 3:
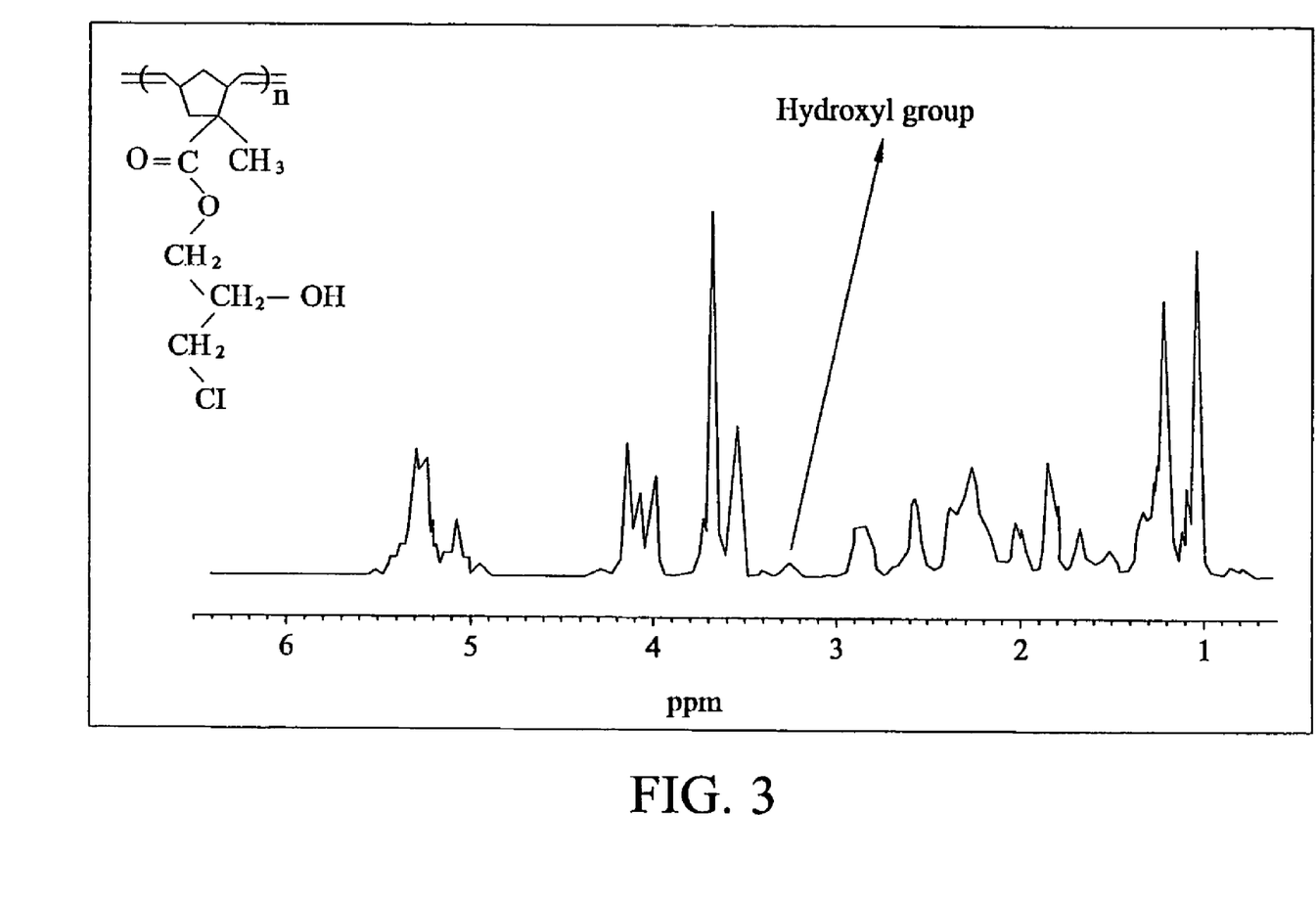
FIG. 3 shows 400 MHz $^1$H NMR spectrum of Poly-NBH-ClMGE obtained from Example 4 of the invention.

FIG. 3 shows 400 MHz $^1$H NMR spectrum of Poly-NBH-ClMGE (obtained from Example 4).

The hydrogen bonded on the carbon adjacent to the chlorine was observed at 3.50~3.70 ppm, and the hydrogen of hydroxyl group was also observed at 3.25 ppm. The hydroxyl group is a functional group, and can be further replaced by a linkable functional group for preparing novel polymer materials. Since the starting material Poly-NBMGE has narrow molecular weight distribution and controllable molecular weight, the obtained Poly-NBHClMGE also showed the same characteristics and thus can be applied in various industrial fields.

Example 5

Synthesis of Norbornene Polymer with Chlorine Groups and Side Chains of Linkable Double Bonds Poly-NBHClMGE (prepared from example 4) was dissolved in dichloromethane, and was dropwisely added into the Poly-NBHClMGE solution. After stirring at room temperature for 4 hr, the result was purified by methanol to obtain Poly-NBHClMGEMOI with narrow molecular weight distribution.

Further, can be used to replace MOI to react with Poly-NBHClMGE to obtain Poly-NBHClMGEMMAC and Poly-NBHClMGEMAC.

The reaction according to Example 5 is shown in reaction formula (V)

reaction formula (V)

PolyNBHClMGE

MMAC

PolyNBHClMGEMMAC

PolyNBHClMGE

MAC

PolyNBHClMGEMAC
wherein, n>1,

Example 6

Synthesis of Norbornene Polymer with Hydroxyl Groups and Side Chains of Linkable Double Bonds Poly-NBMGE (prepared from Example 2) was dissolved in dioxane, and acrylic acid was dropwisely added into Poly-NBMGE solution and heated to reflux for 16 hours to obtain acrylate-with random polyNBMGE-co-NBAA with an epoxy content of 88 mol % and a polyacrylic content of 12 mol %. Since the starting material Poly-NBMGE has narrow molecular weight distribution and controllable molecular weight, the obtained acrylate-with random polyNBMGE-co-NBAA also showed the same characteristics and thus can be applied in various industrial fields. The acrylate-with random polyNBMGE-co-NBAA can be dissolved in $CH_2Cl_2$, THF, DMSO, DMF, DMAc, or N-methyl-2-pyrrdione. Further, the above reaction has a reaction time more than 16 hr, thereby obtaining a gel polymer with epoxy groups exhibiting superior solvent resistance.

The reaction according to Example 6 is shown in reaction formula (VI)

PolyNBMGE-co-NBAA
wherein, n>1 and m>1.

Example 7

Synthesis of Norbornene Block Copolymer with Phthalimide Groups and Epoxy Groups 50 mg of Ru catalyst (RuCl$_2$[C$_{21}$H$_{26}$N$_2$][CHC$_6$H$_5$]P(C$_6$H$_{11}$)$_3$) as disclosed in Example 1 was dissolved in 1 ml of dichloromathene. Next, NBMGE (prepared from Example 1) was dissolved in 20 ml of dichloromathene and degassed thrice via freeze-pump-thaw cycle. Next, NBMGE solution was added into a bottle with Ru catalyst solution at 30° C. for 5 hours, wherein the molaity ratio of the NBMGE and Ru catalyst ([M]/[I]) was 350. Next, NBMPI was added into the bottle and stirred for 2 hours. Next, 0.2 ml of vinyl ethyl ether was added into the bottle for terminating the reaction. Finally, the result was purified by methanol to thereby obtain norbornene block copolymer with phthalimide groups and epoxy groups Poly(NBMG-b-NBMPI) as a white solid.

The poly-NBMGE had a molecular weight of $7.01 \times 10^4$ (molecular weight distribution (PDI)=1.07), and the Poly(NBMG-b-NBMPI) had a molecular weight of $1.60 \times 10^5$ (molecular weight distribution (PDI)=1.11).

Figure 4:
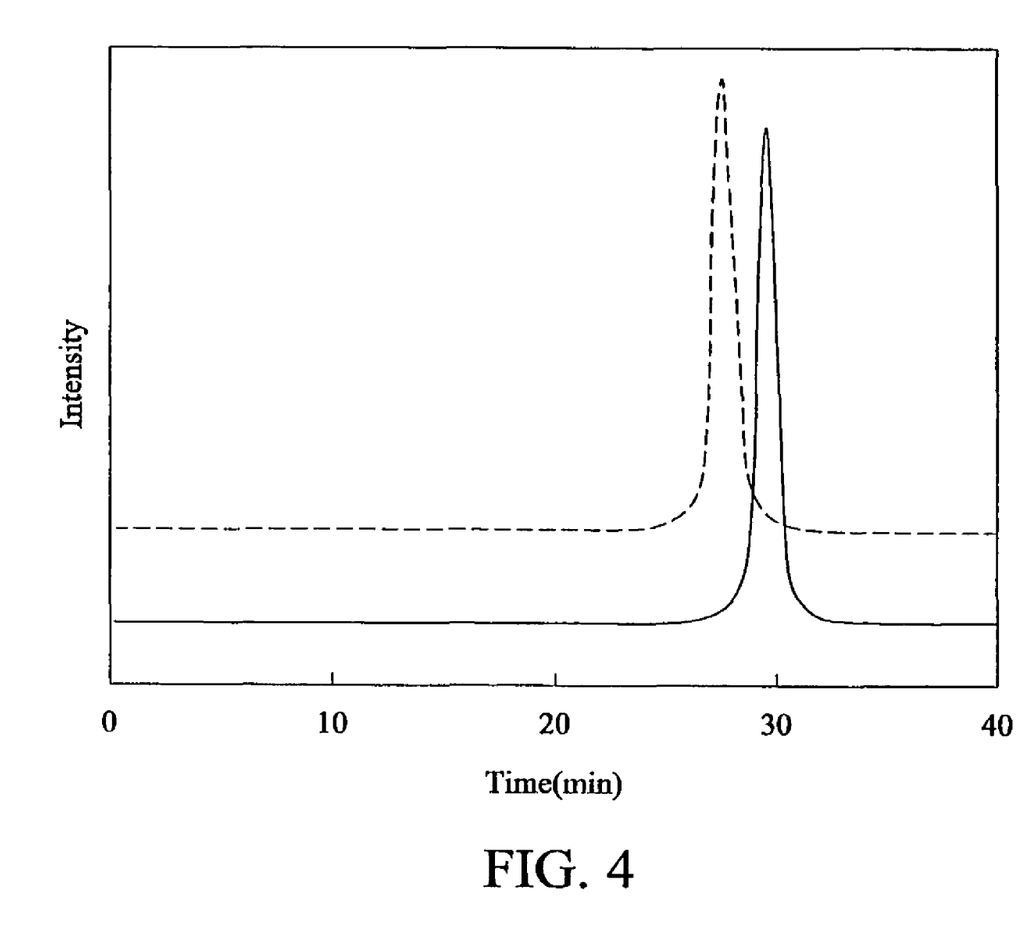
FIG. 4 shows the measurement of molecular weight of poly-NBMGE and Poly(NBMG-b-NBMPI) disclosed in Example 7 of the invention.

Referring to FIG. 4, thick line represents the measurement of molecular weight of poly-NBMGE by GPC, and dotted line represents the measurement of molecular weight of Poly(NBMG-b-NBMPI) by GPC. Accordingly, either poly-NBMGE or Poly(NBMG-b-NBMPI) has narrow molecular weight distribution.

The reaction according to Example 7 is shown in reaction formula (VII)

Poly(NBMGE-b-NBMPI)
wherein, n>1 and m>1.

Example 8

Synthesis of Norbornene Block Copolymer with Phthalimide Groups and Chlorine Groups Poly(NBMGE-b-NBMPI) (prepared from Example 7) was dissolved in dichloromethane and an excess of HCl gas was introduced into the mixture and heated to reflux to prepare Poly(NBMHCIGE-b-NBMPI). The Poly(NBMHCIGE-b-NBMPI) has a hydroxyl group as a functional group which can be further replaced by a linkable functional group for preparing novel polymer materials.

The reaction according to Example 8 is shown in reaction formula (VIII):

Poly(NBMGE-b-NBMPI)

Poly(NBMHClGE-b-NBMPI)
wherein, n>1 and m>1.

Example 9

Synthesis of Norbornene Block Copolymer with Chlorine Groups and Linkable Double Bond Poly (NBMHCIGE-b-NBMPI) (prepared from Example 8) was dissolved in dichloromethane, and was dropwisely added into the Poly (NBMHCIGE-b-NB-MPI) solution. After stirring at room temperature for 4 hour, the result was purified by methanol to obtain Poly(NBMH-CIGEMOI-b-NBMPI) with a narrow molecular weight distribution.

Further, can be used to replace MOI to react with Poly (NBMHCIGE-b-NBMPI) to obtain Poly(NBMHCIGEMMAC-b-NBMPI) and Poly(NBMHCIGEMAC-b-NBMPI).

The reaction according to Example 9 is shown in reaction formula (IX)

reaction formula (IX)

Poly(NBMHClGE-b-NBMPI)

Poly(NBMHClGEMOI-b-NBMPI)

Poly(NBMHClGEMAC-b-NBMPI)

Poly(NBMHClGEMMAC-b-NBMPI)
wherein, n>1 and m>1.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of preparing a norbornene block copolymer, comprising:
polymerizing a norbornene compound with epoxy groups, comprising a structure represented by formula (I), of:

in the presence of $RuCl_2[C_{21}H_{26}N_2][CHC_6H_5]P(C_6H_{11})_3$ as catalyst for preparing the polymer with side chains of epoxy groups comprising a structure represented by formula (II), of:

reacting the polymer with side chains of epoxy groups comprising a structure represented by formula (II) with a norbornene monomer with phthalamide group represented by for preparing a norbornene block copolymer comprising a structure represented by formula (VIII), of:

reacting the norbornene block copolymer comprising a structure represented by formula (VIII) with a norbornene monomer with HCl for preparing a norbornene block copolymer comprising a structure represented by formula (IX), of:

and reacting the norbornene block copolymer comprising a structure represented by formula (IX) with for preparing a norbornene block copolymer represented by formula (X), of:

formula (XI), of:

or formula (XII), of:

wherein,
$R^1$ is H or $CH_3$;
n is an integer between 2 to 10000; and
m is an integer between 2 to 10000.

* * * * *